May 2, 1961  W. F. JACKSON ET AL  2,982,148
CONTROL DEVICE
Original Filed Aug. 2, 1956
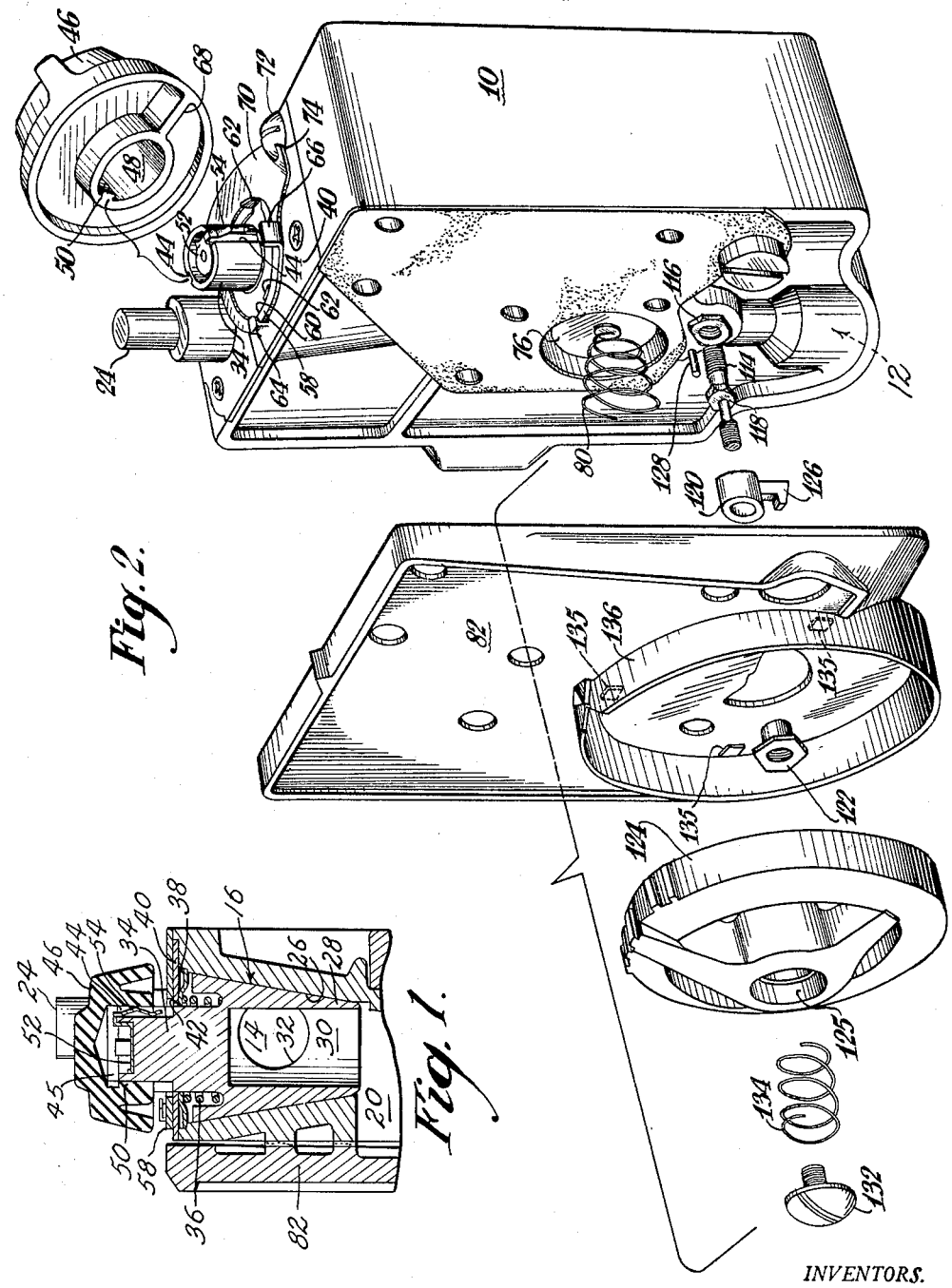
INVENTORS.
Wilbur F. Jackson and Theodore J. Dykzeul.
BY
THEIR ATTORNEY.

United States Patent Office 2,982,148
Patented May 2, 1961

2,982,148

CONTROL DEVICE

Wilbur F. Jackson and Theodore J. Dykzeul, Compton, Calif., assignors to Robertshaw-Fulton Controls Company, Richmond, Va., a corporation of Delaware Original application Aug. 2, 1956, Ser. No. 601,802, now Patent No. 2,953,937, dated Sept. 27, 1960. Divided and this application Sept. 30, 1957, Ser. No. 687,123

4 Claims. (Cl. 74—504)

This invention relates to control devices which are manually adjustable and more particularly to the adjustment and calibration means in a control device including a thermostatically controlled valve and a rotary shut-off cock.

This application is a division of our application Serial No. 601,802, filed August 2, 1956, now Patent No. 2,953,937.

It is an object of this invention to adjust the limit of rotation of a shut-off cock and thereby adjust the capacity of the same when in its "on" position.

Another object of this invention is to produce an approved calibrating means and adjustment means for a thermostatic valve.

Another object of this invention is to mount a manually operable dial and an operating shaft for the thermostatic valve whereby the same will be substantially unaffected by accidental blows or forces.

In one preferred embodiment of the invention a shut-off cock and thermostatic valve are mounted within a casing for controlling the flow of fluid through the casing. The shut-off cock is movable from an "off" position through a predetermined range of increasing capacity in an "on" position. A manually operable dial is carried by the shut-off cock and provided with an abutment which is engageable with an adjustable stop on the casing. The stop is adjustable to limit movement of the cock within the said predetermined range thereby to vary the capacity of the cock in the full "on" position thereof.

Other objects and advantages will become apparent from the following description taken in connection with the accompanying drawings wherein:

Fig. 1 is a partial longitudinal section of a control device embodying this invention; and Fig. 2 is an exploded perspective view of parts of the control device.

Referring more particularly to Fig. 1, the control device comprises a casing 10 provided with an inlet (not shown) and an outlet 12 for supplying fuel to a main burner. A fuel passage 14 in the casing 10 provides communication between the inlet (not shown) and a manually operable valve indicated generally by the reference numeral 16. A thermostatic valve is positioned in a chamber 20 which communicates with the valve 16 and a passage 22 which leads to the outlet 12. For a complete description of the structure and operation of the thermostatic valve, reference is made to the above-identified patent. As is customary in such devices, a safety valve (not shown) is positioned in the passage 14 between the valve 16 and the inlet. The safety valve may be responsive to a flame at a pilot burner and provided with a manually operable resetting button 24 which projects exteriorly of the casing 10.

Referring more particularly to the manually operable valve 16, a conical bore 26 is provided in the upper part of the casing 10 and positioned so as to have the main fuel passage 14 opening into the side thereof and continuing out of the bottom thereof. A plug valve member or shut-off cock 28, of generally conical configuration and having a cylindrical bore 30 in the lower portion thereof, is seated in the conical bore 26 and is adapted for turning movement therewithin. A circular opening 32 is provided in the wall of the plug valve member 28 and is adapted to allow communication between the passage 14 and the interior of the plug valve 28.

In the position shown, wherein the plug valve member 28 is turned to align the opening 32 with the passage 14, fuel will flow through the opening 32 into the cylindrical bore 30 of the plug valve member 28 and out of the open bottom thereof to the thermostatic valve 18. However, shsould the plug valve member 28 be rotated clockwise from the position shown in Fig. 1, the opening 32 will face the wall of the conical bore 26 and flow of fuel will be prevented through the passage 14. It will be apparent that when the plug valve member 28 is rotated from the "off" position to the "on" position shown in Fig. 1, the plug valve member 28 will move through a substanital range of movement from the time the opening 32 first communicates with the passage 14 until the opening 32 is aligned with the passage 14, as shown in Fig. 1.

The plug valve member 28 is provided with a generally cylindrical end portion 34 which projects exteriorly of the casing 10. A spring 36 encircles the end portion 34 and is mounted in compression between a recess formed in the valve member 28 and a washer 38. The washer 38 is biased by the spring 36 into engagement with a cover plate 40 which is attached to the end of the casing 10. The end portion 34 projects through an opening 42 in the cover plate 40 and is provided with suitable slots 44 (Fig. 2) by means of which a manually operable dial 46 is attached to the end of the portion 34. As shown more clearly in Fig. 2, the dial 46 is provided with a cylindrical bore 48 for receiving the end portion 34 and an abutment 50 within the bore 48 for cooperation with one of the slots 44 and to key the dial 46 to the end portion 34. A washer 52 having an extending spring portion 54 is fixed to the end of the portion 34 whereby the spring portion 54 is cooperable with the slot 44 to create a biasing force on the dial 46 which tends to hold the same into engagement with the portion 34. It will be apparent that rotation of the dial 46 will effect rotation of the plug valve member 28 between open and closed positions.

It has been customary in such devices to provide visual indication of the "on" and "off" positions of the shut-off cock. To this end, the cover plate 40 may be provided with a suitable index (not shown) for cooperation with suitable indicia (not shown) on the dial 46. Also, the washer 38 may be utilized to provide a stop (not shown) for preventing rotation of the dial 46 beyond the "on" or "off" position of the cock 28. With such means, clockwise rotation of the valve member 28 will be prevented when the opening 32 faces the wall of the tapered seat 26 in the "off" position and counterclockwise rotation of the valve member 28 will be prevented when the opening 32 is aligned with the passage 14.

It has been found that the flow of fuel permitted when the opening 32 is aligned with the passage 14 sometimes exceeds the capacity of the burner which the device controls. Accordingly, means are provided in this invention for limiting the capacity of the valve 16 in the "on" position thereof. Referring to Fig. 2, a generally circular disc 58 is rotatably mounted on the cover plate 40 and provided with a central bore 60 through which the end portion 34 projects in axial alignment therewith. Three spaced lugs 62, 62 (two of which are visible in Fig. 2) project from the cover plate 40 and engage the edges of the bore 60. Another lug 64 projects from the cover plate 40 and engages the periphery of the disc 58. A portion of the lug 64 is bent over the edge of the disc 58 to thereby prevent displacement of the same relative to the cover plate 40. The lugs 62, 64 are angularly spaced from the center of the bore 60 and thereby guide the disc 58 for rotation about the longitudinal axis of the bore 60 and the portion 34.

The disc 58 is provided with an upturned lug or stop 66 on the periphery thereof which is adapted to be engaged by an abutment 68 formed on the underside of the dial 46 during rotation of the dial 46. The stop 66 is preferably positioned to be engageable by the abutment 68 during movement of the valve 28 between the position wherein the opening 32 moves into communication with the passage 14 and a position wherein the opening 32 is in axial alignment with the passage 14.

To enable adjustment of the angular position of the stop 66 and the disc 58, the disc 58 is provided with a coplanar integral portion 70 extending from a portion of the periphery thereof adjacent the stop 66. A screw 72 extends through the cover plate 40 and is threaded into casing 10 in a position whereby a portion of the head thereof will overlie the edge of the portion 70 and clamp the same into rigid engagement with the cover plate 40 when the screw 72 is tightened. The outer edge of the portion 70 is generally curved and has the same center of curvature as the disc 58 whereby the head of the screw 72 will overlie the edge of the portion 70 over its arcuate length.

The portion 70 is provided with an upwardly bent lug 74 at the end thereof by means of which the disc 58 may be manually rotated to a selected angular position. The lug 74 is also engageable by the screw 72 to limit rotation of the disc 58.

In the position shown, the disc 58 is in its extreme counterclockwise position wherein the lug 74 engages the screw 72. In this position of the disc 58 and lug 66, the dial 46 may be rotated counterclockwise until the opening 32 is aligned with the passage 14. In this last said position of the dial 46, the capacity of the cock 32 will be maximum thereby permitting maximum fuel flow to the burner.

Should the disc 58 be rotated clockwise, it will be apparent that abutment 68 in the dial 46 will engage the stop 66 before the opening 32 is completely aligned with the passage 14 thereby reducing the capacity of the cock 28. Thus, by manually adjusting the disc 58, the capacity of the cock 28 in the full "on" position of the dial 46 is adjusted. By means of the screw 72, the disc 58 may be clamped in any selected position.

*Operation*

To place the control device in an operative condition, the dial 46 is rotated counterclockwise until abutment 68 engages the stop 66, and the dial 124 is rotated clockwise to a selected temperature setting. If the capacity of the shut-off cock 28 exceeds that of the burner, the screw 72 may be loosened and the disc 58 rotated clockwise to decrease the capacity of the cock 28 at the position where abutment 68 engages the stop 66. Re-tightening of the screw 72 will clamp the disc 58 in the last said position to thereby limit rotation of the dial 46 and provide a full "on" position of the cock 28 at this reduced capacity. If the capacity of the burner exceeds the capacity of the cock 28, the disc 58 may be rotated counterclockwise to increase the capacity of the cock 28 in the "on" position thereof.

It will be apparent that the opration of the disc 58 provides a simple economical means for adjusting the capacity of the cock in the "on" position thereof.

While only one embodiment of the invention has been herein shown and described, it will be apparent to those skilled in the art that many variations in the construction and arrangement of parts may be made without departing from the scope of the invention as defined in the appended claims.

We claim:

1. A control actuating mechanism comprising a cover member having an aperture therein, a rotatable stem having a portion projecting through said aperture, stop means on said cover including an annular disc surrounding said projecting stem portion and having a stop element formed thereon, a rotatable dial secured to said projecting stem portion and having a stop element thereon coacting with said stop element on said disc to establish limit positions for rotation of said stem, said disc having a segmental portion extending outwardly beyond said dial, and a clamping element carried by said cover and located in normal clamping engagement with the marginal outer edge of said segmental portion, said element being disengageable therefrom for manual adjustment of said disc to vary said limit positions.

2. A control actuating mechanism comprising a cover member having an aperture therein, a rotatable stem having a portion projecting through said aperture, stop means on said cover including an annular rotatable disc surrounding said projecting stem portion and radially spaced therefrom, said disc and cover member having cooperating guide means for maintaining said radial spacing upon rotation of said disc, said disc having a stop element formed thereon, a rotatable dial secured to said projecting stem portion and having a stop element thereon coacting with said stop element on said disc to establish limit positions for rotation of said stem, said disc having a segmental portion extending outwardly beyond said dial, and a clamping element carried by said cover and located in normal clamping engagement with the marginal outer edge of said segmental portion, said element being disengageable therefrom for manual rotation of said disc to adjust the same to vary said limit positions.

3. A control actuating mechanism comprising a cover member having an aperture therein, a rotatable stem having a portion projecting through said aperture, stop means on said cover including an annular rotatable disc surrounding said projecting stem portion and radially spaced therefrom, said disc and cover member having cooperating guide means for maintaining said radial spacing upon rotation of said disc, said disc having an upstanding stop lug formed thereon, a rotatable dial secured to said projecting stem portion in overlying relation to said disc, said dial having a recessed underside defining an abutment coacting with said stop lug on said disc to establish limit positions for rotation of said stem, said disc having a segmental portion extending outwardly beyond said dial and terminating at one end in an upturned lug, and a clamping screw carried by said cover having an enlarged head overlying the adjacent marginal outer edge of said segmental portion in normal clamping engagement therewith, said head being disengageable therefrom upon operation of said screw whereby manual engagement of said upturned lug to effect rotation of said disc will adjust the same to vary said limit positions.

4. A control actuating mechanism comprising a cover member having an aperture therein, a rotatable stem having a portion projecting through said aperture and spaced from the inner wall thereof, said cover having a plurality of upturned lugs on said inner wall, stop means seated on said cover including an annular rotatable disc having the inner wall thereof in registry with said inner wall of said aperture and engaging said lugs, said inner wall of said disc and said lugs being adapted to form cooperating guide means for maintaining said registry upon rotation of said disc, said disc having an upstanding stop lug formed on the outer wall thereof, a rotatable dial secured to said projecting stem portion in overlying re-relation to said disc, said dial having a recessed underside defining an abutment coacting with said stop lug on said disc to establish limit positions for rotation of said stem, said disc having a segmental portion extending outwardly beyond said dial and terminating at one end in an upturned lug, and a clamping screw carried by said cover having an enlarged head overlying the adjacent marginal outer edge of said segmental portion in normal clamping engagement therewith, said head being disengageable therefrom upon operation of said screw whereby manual engagement of said upturned lug to effect rotation of said disc will adjust the same to vary said limit positions.

References Cited in the file of this patent

UNITED STATES PATENTS

| | | | |
|---|---|---|---|
| 148,922 | Brown et al. | Mar. 24, | 1874 |
| 912,717 | Murphy | Feb. 16, | 1909 |
| 1,104,918 | Mouat | July 28, | 1914 |
| 2,672,292 | Caparone | Mar. 16, | 1954 |

FOREIGN PATENTS

| | | | |
|---|---|---|---|
| 545,995 | Great Britain | June 23, | 1942 |
| 1,077,909 | France | May 5, | 1954 |